United States Patent [19]

Watson

[11] Patent Number: 5,013,247
[45] Date of Patent: May 7, 1991

[54] FIBER OPTIC CONNECTOR ASSEMBLY ADAPTED FOR PROVIDING CIRCUIT CARD CHARGING

[75] Inventor: Joseph L. Watson, Apalachin, N.Y.

[73] Assignee: International Business Machines Corporation, Armonk, N.Y.

[21] Appl. No.: 422,337

[22] Filed: Oct. 16, 1989

[51] Int. Cl.$^5$ .............................................. H01R 9/09
[52] U.S. Cl. ..................................... 439/55; 439/329; 439/924; 350/96.2
[58] Field of Search ................. 350/96.2, 96.21, 96.22; 439/59, 55, 61, 62, 64, 78, 924, 329

[56] References Cited

U.S. PATENT DOCUMENTS

| | | | |
|---|---|---|---|
| 3,432,795 | 3/1969 | Jayne | 439/924 X |
| 3,973,817 | 8/1976 | Stalley et al. | |
| 3,993,935 | 11/1976 | Phillips et al. | 317/101 C |
| 4,079,440 | 3/1978 | Ohnuma et al. | 361/424 |
| 4,272,143 | 6/1981 | Weiss | |
| 4,305,633 | 12/1981 | Engberg et al. | |
| 4,377,315 | 3/1983 | Grau | |
| 4,416,497 | 11/1983 | Brandsness et al. | |
| 4,579,406 | 4/1986 | Laursen et al. | |
| 4,597,631 | 7/1986 | Flores | 350/96.2 |
| 4,655,518 | 4/1987 | Johnson et al. | 439/62 |
| 4,678,264 | 7/1987 | Bowen et al. | 350/96.20 |
| 4,684,245 | 8/1987 | Goldring | 356/41 |
| 4,721,355 | 1/1988 | Gould | 350/96.20 |
| 4,722,586 | 2/1988 | Dedson et al. | 350/96.20 |
| 4,726,775 | 2/1988 | Owen | 439/49 |
| 4,895,425 | 1/1990 | Iwano et al. | 350/96.2 |
| 4,906,197 | 3/1990 | Noll | 439/924 X |

FOREIGN PATENT DOCUMENTS

| | | | |
|---|---|---|---|
| 1143559 | 2/1963 | Fed. Rep. of Germany | 439/59 |
| 3134278 | 3/1983 | Fed. Rep. of Germany | 439/62 |

OTHER PUBLICATIONS

IBM TDB, vol. 21, No. 4 (09/78) "Optical Circuit Module Connector" Cefarelli and Evans.
IBM TDB, vol. 22, No. 9 (02/80) "Completely Integrated Fiber-Optic Link", Redmond.
"Fiber-Optic Data Transmission: a Practical, Low-Cost Technology", Hermann Schmid, *Electronics*, Sep. 2, 1976.
IBM Bulletin, vol. 11, No. 7, 12-1968, Printed Circuit Card Connector, Berger et al.

*Primary Examiner*—Neil Abrams
*Assistant Examiner*—Khiem Nguyen
*Attorney, Agent, or Firm*—Lawrence R. Fraley

[57] ABSTRACT

In a circuit card assembly for use within an information processor (computer) wherein the assembly includes a fiber optic connector assembly as part thereof, there is provided means for enabling electrical connections to be made to the circuit card's circuitry in the same area as the fiber optic connector's housing so that charging of the card (to the potential of the mother board to which it will be coupled) can occur prior to coupling of the card to the board. Once the card is positioned and thus connected to the board, the charging means of the invention can be removed and a desired fiber optic connector inserted within the housing so that desired optical connections can be made with corresponding components (e.g., receiver, transmitter) which form part of the circuit card assembly. Both optical and electrical connections thus occur within the same housing.

12 Claims, 4 Drawing Sheets

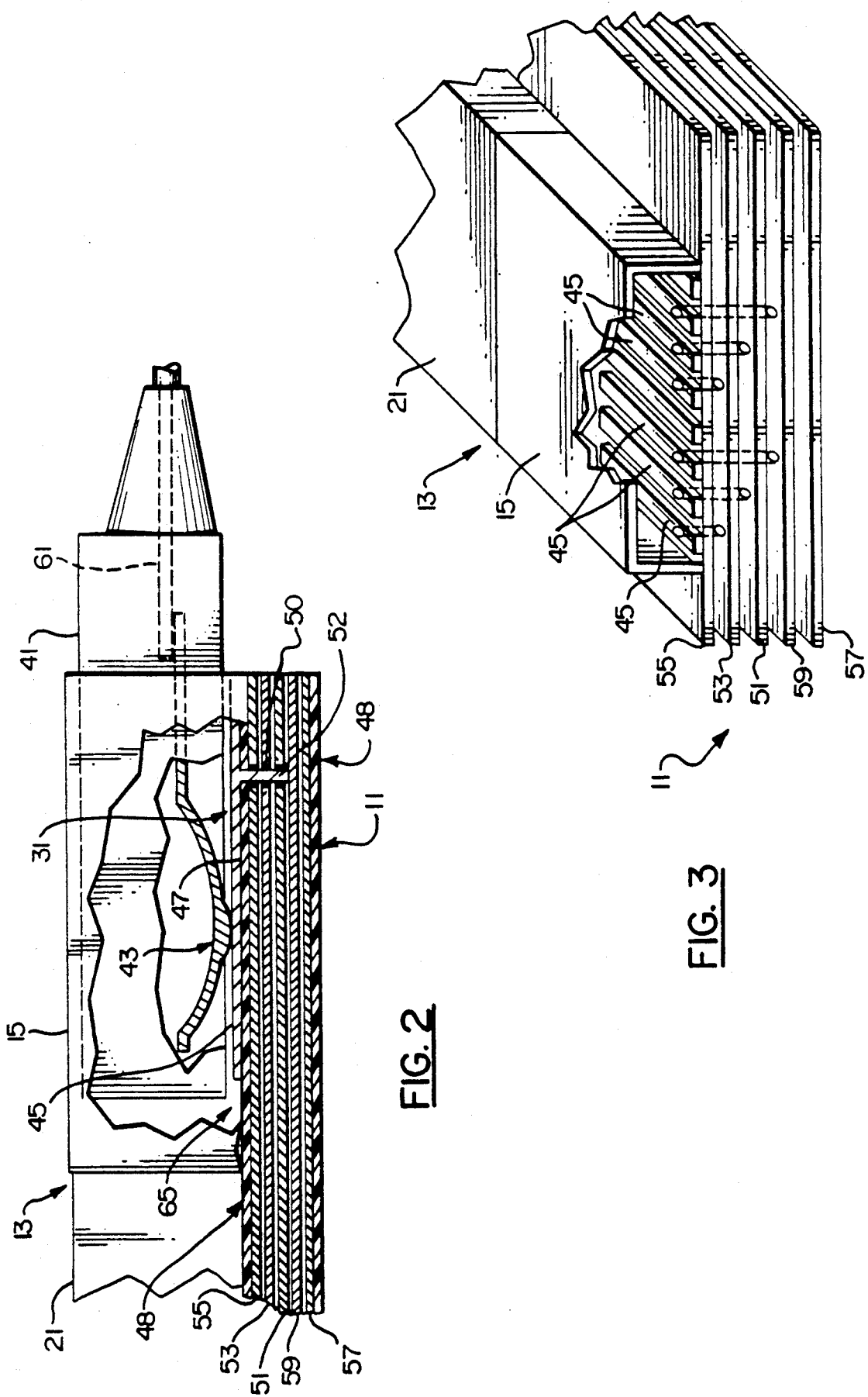

FIBER OPTIC CONNECTOR ASSEMBLY ADAPTED FOR PROVIDING CIRCUIT CARD CHARGING

TECHNICAL FIELD

The invention relates to fiber optic connectors and particularly to such connectors as used in information handling systems (computers) and the like which utilize printed circuit cards and/or boards.

BACKGROUND

Manufacturers and those who utilize information handling systems have become extremely interested in the use of optical fibers as a means for transmitting information. Advantages of optical fibers over other kinds of transmission media are well known. For example, such systems are resistant to electromagnetic interference which occasionally plagues systems using electrical cables. Additionally, optical systems are considered more secure than electrical systems since it is substantially more difficult for unauthorized personnel to tap or access an optical fiber without being detected.

As is also known, optical fibers transmit information using single or multiple strands of fibers each having an inner circular glass core coated with a circumferential cladding having a different index of refraction. Light is transmitted along the core and reflected internally of the cladding. Transmission lines as used in information handling systems known today are formed of either a single fiber or a plurality (bundle) of such fibers encased within a protective sheath. As also known, such fibers are coupled to various fiber optic connector assemblies and utilized within computers in selected manners.

One such example is shown in U.S. Pat. No. 4,678,264 (Bowen et al). Such connections are typically of the single or duplex variety, the latter involving a pair of optical fiber cables terminating within a single connector member which is designed for being inserted within a respective housing located on a designated component (e.g., a printed circuit card) which forms part of the computer. In the case of a single cable, this is also located within a connector member designed for insertion within a respective housing. Such housings may be positioned on or relative to the circuit card and are particularly designed to accommodate the fiber optic connector therein such that appropriate optical connections can be accomplished between the optical fibers and associated elements (e.g., transmitters and receivers) employed in the system when the connector is so positioned. In those situations wherein transmitter and receiver elements are used in a paired, adjacent orientation and coupled to the circuitry of the circuit card or like member, a duplex form of connector is preferably used. Further, it is also known in such computer systems to utilize a plurality of such cards and electrically connect these to a common backplane circuit board member or the like, said board member also forming part of the overall system. The various cards, board, connectors, wiring and several other elements are located within what is often referred to as a cage assembly, which assembly may form one of several such assemblies within the overall system. Still further, such computer systems may in turn include their own power supply or the like, which in turn may be connected to a local power source.

Many in the computer industry have expressed the desire to make electrical connections between the circuit card and board components within the system without shutting down the system. This is desired to permit card replacement, repair and upgrading without interruption to the services being provided by the computer. This feature is particularly desired by those among the telephony and high end computer users and designers.

Early attempts at such "power on" connections were achieved by simply plugging in the card while the computer was in operation. The unfortunate results of such an operation included the formation of arcs where such connections were made or broken. Additionally, errors in software operation were detected during such connections, subsequently attributed to the aforementioned arcing. More drastically, on some occasions the connection did fail, said failure also deemed the result of the arcing. Arcing of this type particularly occurs when a significant potential difference exists between the board and card members. Excessively high current flows as the result of the system's power supply charging the capacitance of the card as rapidly as possible. By way of example, the portion of the connector within the computer into which the card is to be inserted may be at a voltage of about 25 volts while the card is at a voltage of zero. Arc generation resulting from such a differential may in turn create "noise" in the form of electromagnetic waves which propagate within the computer, affecting other components (occasionally in an adverse manner). For example, such components may pick up this noise as a standard internal signal and react accordingly. Significant errors can thus be created in both system and software operation as a result of such arcing.

To overcome the above highly undesirable results, while still providing desired optical connections between selected optical fiber elements and respective components which form part of a circuit card member, the present invention provides a fiber optic connector assembly capable of being positioned on such a circuit card and adapted for not only receiving a fiber optic connector but also uniquely providing a means whereby electrical connections can be made to the circuit card in the same vicinity of the card as the connector assembly's housing such that charging of the card and its electrical components (e.g., to the potential of the board to which this and other cards may be electrically coupled) can occur, thereby preventing arcing or the like from occurring during such coupling or uncoupling. As will be defined further herein, such charging of the card occurs with the card separated from the mother board member such that the card's electrical potential can be raised to that of the board whereupon card coupling can occur. The charging unit can then be facilely removed from the card and the desired fiber optic connector positioned within the assembly.

It is believed that such a connector assembly would constitute a significant advancement in the art.

DISCLOSURE OF THE INVENTION

It is a primary object of the invention to enhance the art of fiber optic connectors and particularly those used in information handling systems or the like which utilize circuit card and board assemblies.

It is another object of the invention to provide an improved fiber optic connector assembly which enables both optical and electrical connections to occur therein.

It is yet another object of the invention to provide such an assembly which operates in a relatively simple manner and which can be produced relatively inexpensively.

These and other objects, advantages and features are achieved in accordance with one aspect of the invention by an improved fiber optic connector assembly for use as part of a circuit card assembly to provide optical connections to selected circuitry which forms part of the circuit card. The connector assembly includes a housing positioned on the card and designed for having the fiber optic connector positioned therein such that these connections can occur. Additionally, means is also provided in the invention whereby electrical connections can be made to the card's circuitry in the same area of the card occupied by the housing such that electrical charging of the card can occur in this area.

BRIEF DESCRIPTION OF THE DRAWINGS

FIG. 2 is an enlarged view, partially in section, illustrating one of the circuit card assemblies of the invention wherein an electrical connector is shown as being positioned within the assembly's housing atop the circuit card;

FIG. 3 is a front, partial perspective view of one of the assemblies of the invention, more clearly illustrating one example of how various electrical connections may be made to preselected circuit layers located within the circuit card by the circuit tabs of the invention;

BEST MODE FOR CARRYING OUT THE INVENTION

For a better understanding of the present invention, together with other and further objects, advantages and capabilities thereof, reference is made to the following disclosure and the appended claims in connection with the above-described drawings. drawings.

Figure 1:
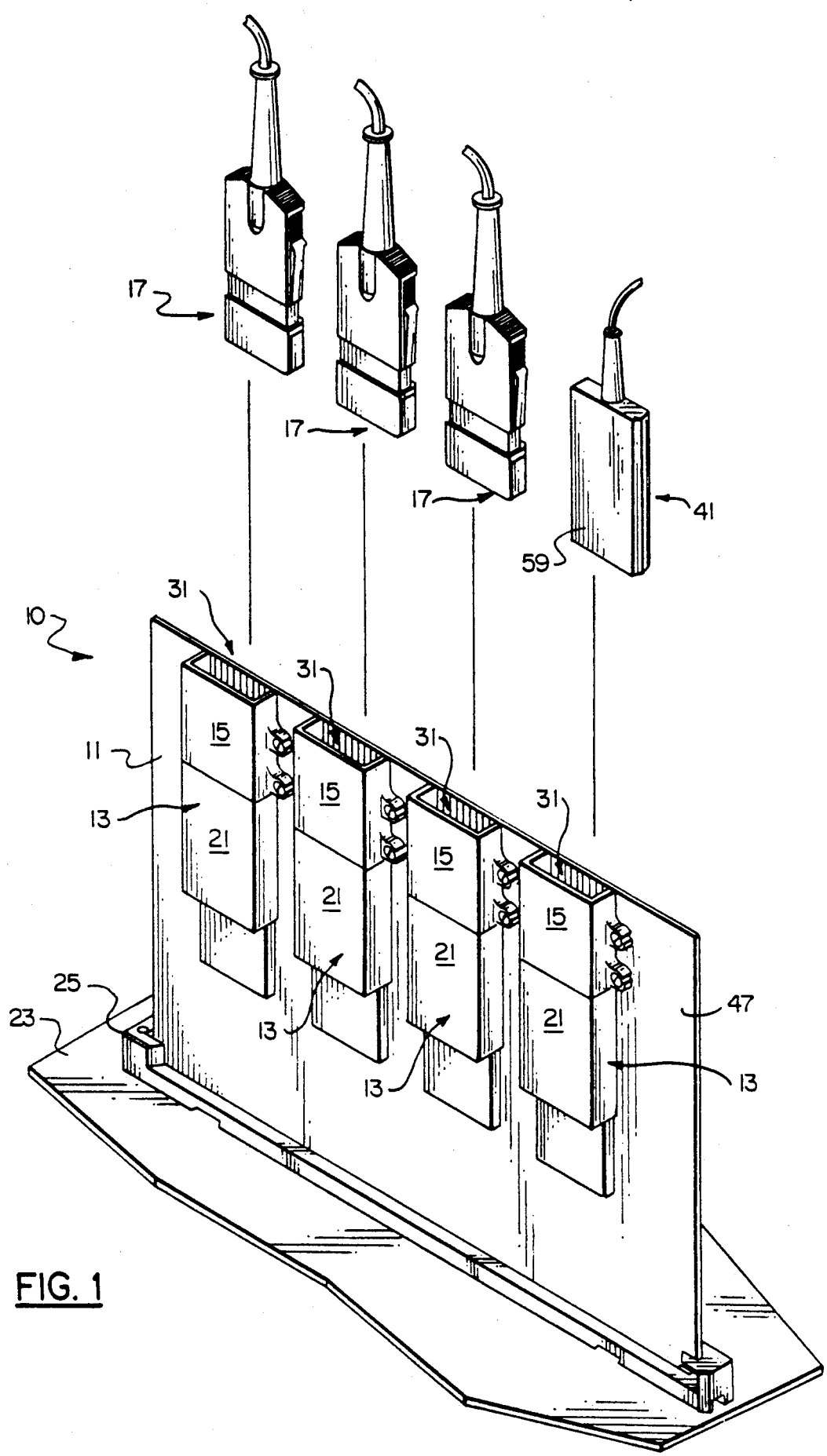
FIG. 1 is a perspective view of a plurality of improved circuit card assemblies in accordance with a preferred embodiment of the invention, each of said assemblies shown as being positioned (in a side-by-side relationship) on a circuit card member designed for being electrically coupled to a mother circuit board.

With particular attention to FIG. 1, there is shown an improved circuit card assembly 10 in accordance with a preferred embodiment of the invention. Circuit card assembly 10 includes a circuit card 11 and at least one fiber optic connector assembly 13 which is located on card 11 and designed for being optically connected to corresponding circuitry of the card. In the invention depicted in FIG. 1, four assemblies 13 are shown and positioned on the singular card 11 in a side-by-side relationship. Each assembly 13 is fixably secured to the card and includes a housing 15 as part thereof and designed for receiving therein a fiber optic cable connector 17 (three of the four being shown in FIG. 1). Each fiber optic cable connector 17, in one embodiment of the invention, is of the duplex connector variety (containing two optical fiber elements therein). In the particular embodiment of the invention depicted herein, each of the fiber optic connector assemblies 13 also includes both transmitting and receiving elements located therein (e.g., within the structure 21 adjacent housing 15). Such components (transmitters, receivers) are known in the art and typically include a pin diode or similar receiver for receiving the optical signal through one of the respective optical fibers and a transmitting component (e.g., laser or LED) designed for transmitting optical signals to the other optical fiber within the inserted duplex connector. Elements of this type are known in the art, including the defined duplex connectors, and further description is not believed necessary.

As understood herein, each of the fiber optic connector assemblies of the invention is designed for being fixedly positioned on an outer edge portion of card 11 such that access thereto (for insertion of the respective fiber optic cable connectors and, as defined below, the charging electrical connector of the invention) can be readily achieved in most cage assembly configurations. This represents a highly advantageous feature of the invention in that both side and top access is afforded, given the configurations for most of these cage assemblies currently known in the art. As such, each fiber optic connector assembly 13 is located adjacent a predetermined area 31 on each card, said area 31 in the preferred embodiment of the invention extending substantially to the outermost edge of the card and projecting an established distance toward the center of card 11. As shown, the housing 15 for each assembly is located immediately adjacent (relative to) the respective one of each areas and the remaining structure 21 of each such assembly extends inwardly toward the center of card 11. The housing 15 (and structure 21 as well) of each assembly 13 is thus mounted substantially flush to the external surface of the card 11.

Each of the transmitting and receiving elements (not shown) in structure 21 is electrically coupled to corresponding circuitry within card 11 utilizing known means. For example, each of these elements may include a pinned portion (e.g., three copper wires, bent at predetermined angles) which is inserted within the card and thereby electrically connected to respective circuit layers within the card (such cards typically of multilayered configuration having more than one conductive (e.g., signal, power) layers therein separated by appropriate dielectric material). Alternatively, it is also possible in this invention to utilize an additional substrate member (e.g., ceramic) having circuitry thereon and electrically connecting such elements thereto. This added substrate's circuitry may in turn be electrically connected (e.g., using metallic pins) to the card's circuitry in a predetermined fashion. Such an additional substrate and other essential elements used in conjunction therewith can also be positioned within the adjacent structure 21 which forms part of each assembly 13. To provide heat sinking, each of these structures may also include a suitable heat sink or the like as part thereof and may also be of a suitable heat conducting, metallic material (e.g., aluminum) as is known in the art. Further description of these structures is thus believed not necessary.

Connector 25 may comprise what is referred to in the art as a zero insertion force connector having an elongated slot therein and a plurality of cam-actuated spring contacts (not shown) located within the connector's housing and designed for engaging respective circuitry located on card 11 when the card is inserted within the housings' slot and the contacts are actuated (e.g., by a handle-actuated cam). Such connectors are known in the art and further description is not believed necessary.

As stated above, it is highly desirous in the computer industry to provide a means whereby circuit cards can be plugged and unplugged from the respective mother board while the computer remains in operation. Thus, it is not necessary to shut down the computer and interrupt the services it provides during such removal (e.g., for purposes of replacement or modification or repair). As also stated, however, accomplishing such a feat has in the past resulted in undesirable occurrences such as connection failure, software inoperation, and failure of some of the other components within the final cage assembly (e.g., those also constituting part of the circuit board's structure). These undesirable results, as mentioned, have been determined to be the result of arcing which has occurred at the point of coupling and uncoupling of the circuit card with the mother board.

In order to substantially prevent the above, it is the purpose of this invention to provide means to raise (charge) the voltage level of the circuit card assembly (card and electrical components thereon) to the approximate voltage level of the corresponding mother board prior to insertion of the card within the connector 25 (and thus coupling thereof to the circuitry in board 23). As defined herein, card 11 is to be charged to this higher level prior to insertion and connection of the card within board 23 as defined above and is to be maintained at this charged level during such insertion and connection. As defined herein, the invention has proven capable of providing this highly advantageous feature while substantially eliminating the formation of such arcs or the like and the highly undesirable results thereof.

In accordance with the teachings of the invention, at least one (and preferably all) of the fiber optic assemblies 13 used herein includes therein means for providing for electrical connection to the circuit card to achieve this electrical charging thereof prior to positioning of the card and coupling thereof to the active mother board component. Understandably, after this coupling has occurred, the charging means as defined herein is designed for being removed from the card and, uniquely, the respective fiber optic cable connector 17 may then be located within the same housing from which this connector (41) was removed. In accordance with the preferred teachings of the invention, this means for charging card 11 is accomplished in the same predetermined area of card 11 as occupied by housing 15 of each assembly 13. Thus, such charging occurs at the outermost edge portions of each card to thereby assure the ready access to the card when the card is located within the designated cage assembly. Insertion and removal of each card is thus facilitated by this arrangement, when using the preferred charging means defined herein. As is further understood, this orientation also facilitates alignment of the circuit card prior to such insertion within the respective connector 25 or similar member used to provide coupling to board 23.

To achieve such charging, an electrical connector 41 having substantially similar outer dimensions to that of the respective duplex connectors 17 is utilized and positioned within a respective one of the housings 15 of the fiber optic connector assembly 13. Because four such assemblies are depicted in FIG. 1, it is possible to utilize a corresponding similar number of such charging electrical connectors. It is to be understood, however, that effective charging of card 11 may be possible using but a singular electrical connector 41. It is also understood that once electrical connector 41 is removed from the respective housing 15, one of the duplex connectors 17 is then inserted within this same housing to complete the desired optical connections. Such connections are not achieved, however, until the circuit card is firmly positioned and electrically connected to board 23. Thus, it is understood that in FIG. 1, card 11 will not be connected to board 23 until the electrical connector 41 has been positioned within respective fiber optic connector assembly 13 and sufficient charging has occurred. Should only one connector 41 be utilized with the other (e.g., three) duplex connectors 17, is possible to insert each of these duplex connectors within their own respective fiber optic connector assembly prior to such card positioning. It would then be only necessary to remove a singular connector 41 and insert a duplex connector 17.

In the enlarged view depicted in FIG. 2, the positioning relationship of electrical connector 41 within housing 15 of assembly 13 is better illustrated. This charging connector 41 is inserted within housing 15 and includes a plurality of electrical contacts 43 (only one shown in FIG. 2), each being designed for slidably engaging a respective one of a plurality of conductive circuit tabs 45 located on the upper surface 47 of card 11 and electrically coupled to respective circuit layers within the multilayered card. Such connections, in one example of the invention, are schematically represented in FIG. 3. In the embodiment shown in FIG. 3, eight circuit tabs 45 are utilized. It is to be understood, however, that the invention is not to be limited to this number of such tabs and/or electrical contacts, as several different numbers may be employed.

Each tab 45 is a metallic member (e.g., copper) of a elongated configuration and is spacedly located on surface 47 in a substantially parallel relationship to the remaining tabs 45. As stated, the invention is not to be limited to the use of eight such circuit tabs. It is understood that, for purposes of the invention, a minimum of two such tabs is required, one being electrically connected to the card's ground plane (e.g., 51) and to the other one of the power planes (e.g., 53) which form part of a multilayered card. In one example of the invention, a total of five conductive layers (51, 53, 55, 57, 59) were utilized and connections made to three of these by the illustrated six tabs in the manner shown in FIG. 3. Duplication is thus provided, although not necessary in the broader aspects of the invention. The sectioned, five conductive layers depicted in FIG. 2 (and shown in an expanded view in FIG. 3) represent conductive layers which, as stated, may include one ground plane (51) and at least one power plane (53). In the embodiment depicted in FIG. 2, the upper layer 55 preferably comprises a signal plane as may the lowermost layer 57. Further, the layer 59 preferably constitutes a power plane but at a voltage slightly less than that of power plane 53. The respective layers of dielectric (not shown in section in FIG. 2) which are necessary in a card component such as circuit card 11 to electrically isolate the respective conductive layers are understood to occupy the relative spacings between each conductive layer and lie contiguous thereto. Additionally, dielectric (48) is also preferably utilized on the uppermost and lowermost surfaces of the card, thus covering the outer surfaces of signal planes 55 and 57. As noted in FIG. 2, a portion of the upper dielectric 48 is located under the individual circuit tabs 45 to electrically isolate these from upper conductive layer 55 (except for the tab (or tabs) which will be directly connected to layer 55; here, a portion of dielectric 48 may be removed or connection made therethrough). One example of a suitable dielectric material for use herein is epoxy resin, such a material being known in the art. As stated, electrical connection is necessary between two tabs 45 and a corresponding power plane and ground plane layer. In the side sectional view of FIG. 2, the tab 45 as shown is electrically connected firmly to the power plane 59 and is insulated from the remaining conductive layers within card 11 (by dielectric 50 located in the hole extending through the card). In the aforementioned example wherein five conductive layers were used, the power plane 53 was established at a voltage of about five volts while the lower power plane 59 was established with a voltage of about 3.5 volts. Because charging only occurs through the power and ground planes, connection between tabs 45 and the respective signal planes 47 and 57 is not necessary.

Figure 4:
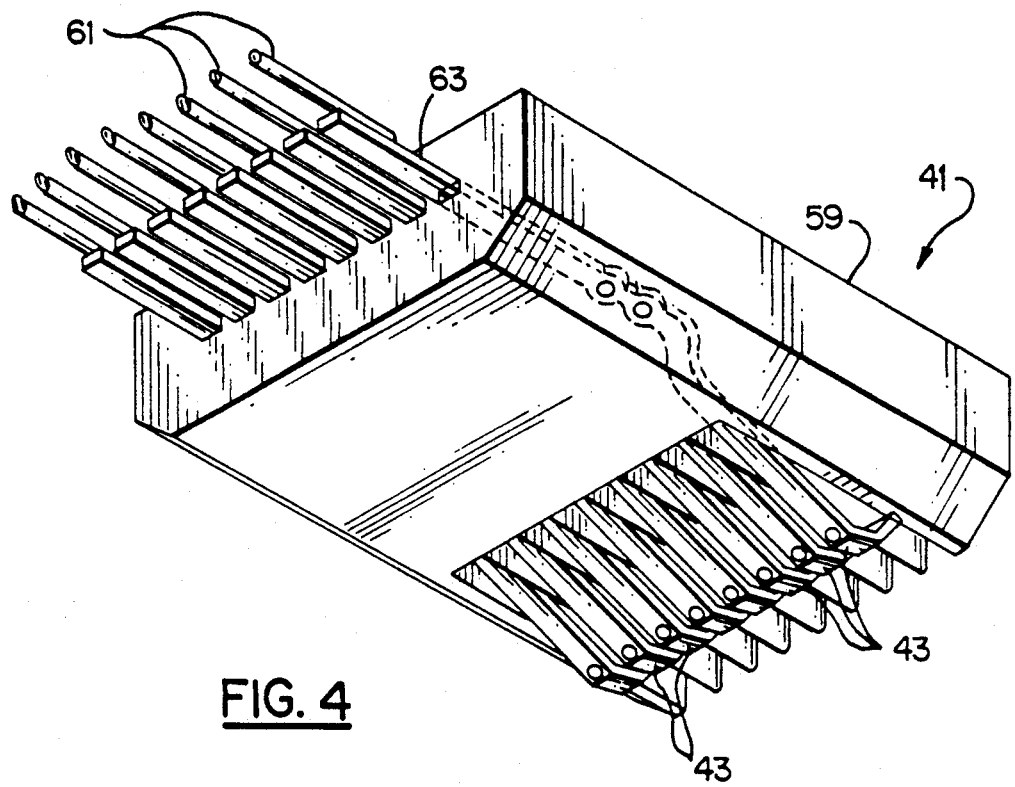
FIGS. 4 and 4A represent perspective views of two different embodiments of electrical connectors which can be used in the invention to accomplish electrical charging of the invention's circuit card, the embodiment in 4A being one wherein different length contacts are used to provide sequential charging of the card.
Figure 4A:
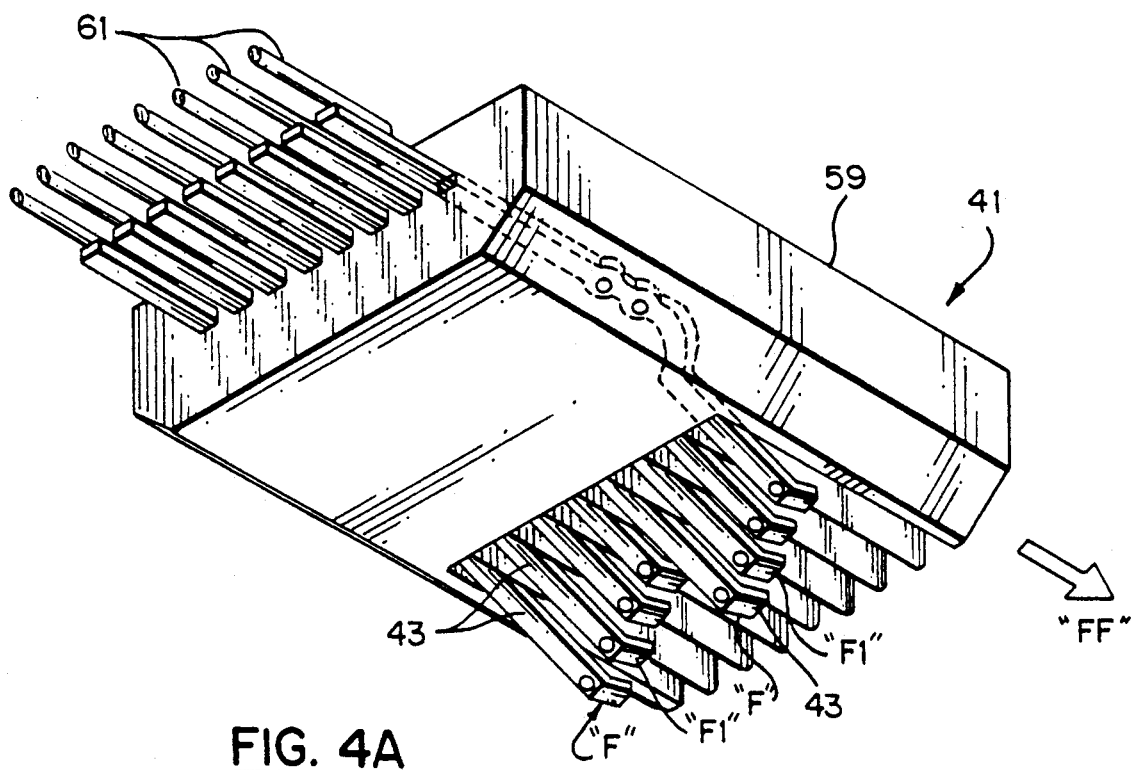

Each of the spring contacts 43 used within connector 41 is preferably metallic (e.g., phosphor bronze or copper) and possesses a curvilinear shape (FIG. 2) or is of the angled configuration such as depicted in FIGS. 4 and 4A.

As shown in FIGS. 4 and 4A, the plurality of spring contacts 43 can better be seen with respect to their orientation within the insulative housing member 59 designed to contain these elements. Each spring 49 is in turn electrically coupled to a respective conductive wire 61 which in turn is coupled to the respective power source (not shown) which provides the appropriate power to effect charging of card 11 and its components. Although not meant to limit the invention, each spring contact 43 includes a projecting leg section 63 which extends through the insulative member 59 and projects externally thereof. Accordingly, each wire 61 is electrically connected (e.g., soldered) to the projecting spring, this wiring (and springs) being surrounded by appropriate insulation (not shown). Spring contacts are preferably utilized to assure an effective wiping type of engagement between the surfaces of each tab 45 and respective contact. Such wiping serves to remove contaminants and other undesirable materials which may adversely affect the sound connection at this point.

As clearly shown in FIGS. 1-3, the aforementioned electrical connections between contacts 43 and respective circuit tabs 45 is accomplished through an opening 65 located within housing 15 adjacent card area 31. Housing 15 is preferably thermoplastic or the like material and an opening may be best easily provided therein in the form of an elongated slot. With the circuit tabs mounted on card 11 as shown and housing 15 in turn located flush to the upper surface 47 of the card, it is seen that each of the circuit tabs is located substantially within the housings' opening and substantially encased by the housing (except for the forward opening into which connector 41 is inserted).

In a preferred embodiment of the invention, electrical connection between the tab 45 and respective conductive layer is accomplished by using plated thru hole technology known in the art. That is, a hole is drilled through the circuit board to the appropriate depth and insulation (e.g., dielectric 50) is provided within this hole (which is plated with a conductive material such as copper) between this plated structure and the remaining conductive layers to which contact is not desired. A pin 52 or similar member secured to or forming part of the respective tab 45 and projecting therefrom may be inserted within the plated thru hole to provide the appropriate connection. An example of such an arrangement is depicted in FIG. 2.

In the embodiment of FIG. 4A, the spring contacts 43 are shown as being of different lengths (in sets of two) such that the invention using this embodiment of the electrical connector will provide for sequential engagement with tabs 45. That is, the longest (or forwardmost) contact ("F") in each grouping will provide initial engagement with a respective circuit tab 45 (all of which are of equal length) while the next longest spring contact ("F1") will become subsequently engaged during forward insertion (direction "FF") in FIG. 4A within the respective housing 15 (not shown in FIG. 4A). Subsequently, the next longest spring contact will make engagement with its own circuit tab, followed by engagement with the next longest (and shortest) spring contact. This staggered contact arrangement assures sequential voltage application to the respective circuit card prior to its insertion and coupling within connector 25 to thus further assure that excessive voltage is not present across the card and its components during initial charging. It is to be understood, however, that if the components used as part of the card are capable of withstanding such initial charging, such a staggered orientation of different length spring contacts may not be necessary. The arrangement depicted in FIG. 4A is preferred, however, to further prevent the opportunity for this undesirable occurrence.

Figure 5:
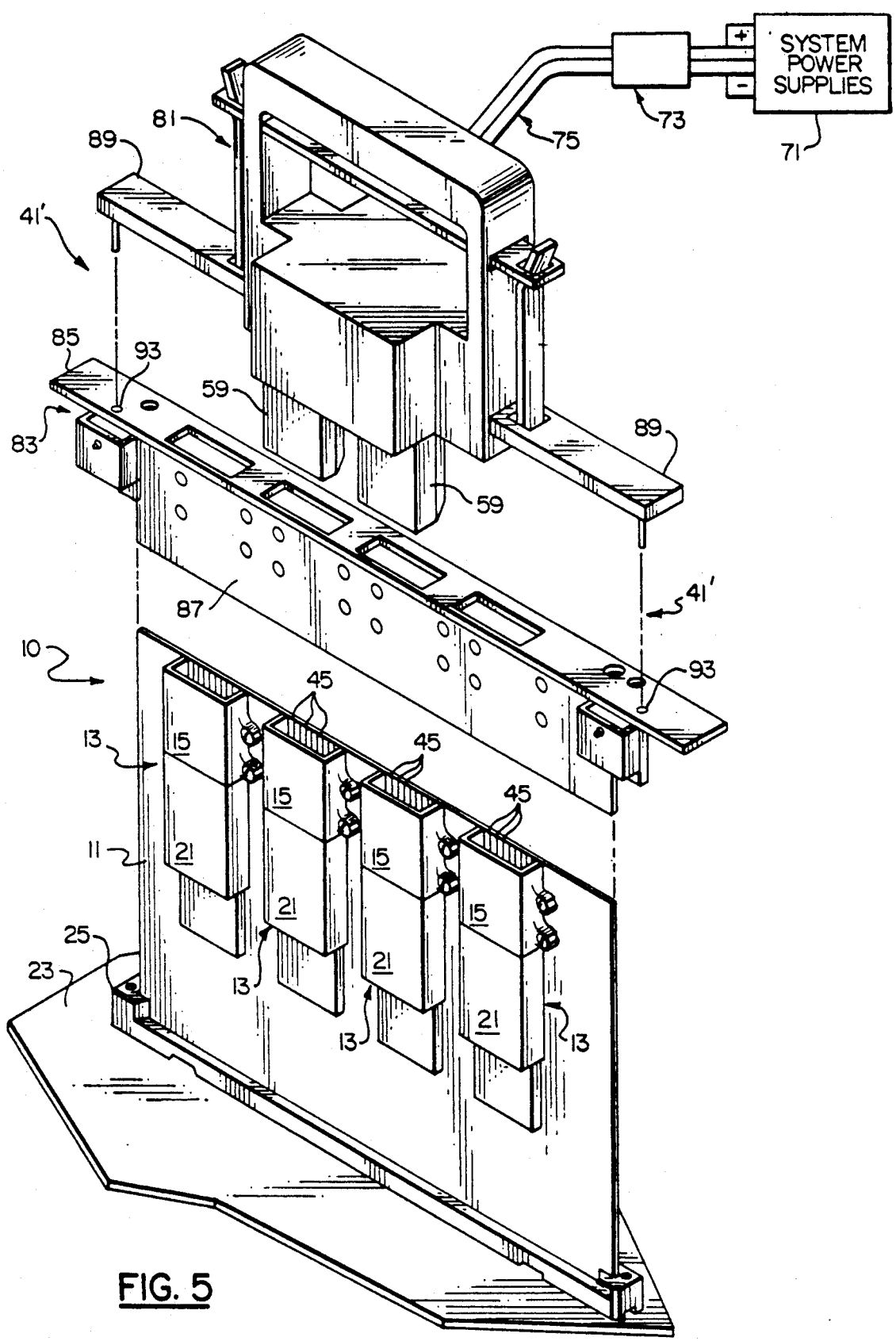
FIG. 5 is an exploded perspective view of an improved circuit card assembly of the invention, illustrating one embodiment of a charging assembly (including electrical connector and handle) capable of being used to charge the assembly's card.

In FIG. 5, there is shown an electrical connector 41' in accordance with an alternative embodiment of the invention. As shown in FIG. 5, connector 41' includes the aforementioned insulative block or similar member 59 having therein the desired plurality of spring contacts (not shown). In the embodiment of FIG. 5, two such electrical connector insulative blocks 59 or the like are utilized to thus provide dual charging capabilities to card 11. It is understood that within the broader aspects of the invention, however, only a singular insulative housing (connector) 59 need be used. Still further, it is possible to use more than two such charging connectors (including up to four in the event four fiber optic assemblies are used). Connector 41' is capable of being electrically coupled to the power supply (or supplies) 71 used in the same computer system designed to accommodate the invention. Thus, an alternative power supply is not necessary to provide charging to the circuit card. Interim connection to a control unit 73 is preferred, this connection between the connector 41' preferably achieved using a flexible cable 75 or the like.

Connector 41' which functions to charge circuit card 11, is connected to the control unit 73 and power supply 71 as shown in FIG. 5. The control unit may contain electronic controls, the values of which are determined by the load requirements of the card being charged. It is further understood that power capacitors, inductors, ferrites, transistors, and resistors with electronic or mechanical switches may be incorporated into this unit's circuitry, and further description is not believed necessary. As is also understood, the overall length of power cable 75 alone may be sufficient current control and isolation from coupled noise. Wherever sequential power application is required, control unit 73, in combination with connector 41' will provide necessary actuation via card position sensing mechanisms, e.g., mechanically operated switches, or optically operated devices designed to active circuitry, this position to be considered during insertion and/or removals of cards (such as card 11).

The location and electrical connections of the charging system as defined here also possesses the following advantages. Current redistribution while charging cards must be considered. Therefore, by adding flexible cable 75 between the units described earlier, an alternative charging path for current is provided. This is separated from the system power busing which continues to supply the operating cards without interruption. Also, isolation from electrically coupled noise is reduced due to the fact that charging is completed via this independent line. Still further, installation is simplified by the use of existing system power supplies, with selected components added per individual design requirements.

Connector 41' includes the handle portion 81 which extends from the members 59 having contacts 43 therein. Handle 81 is designed for being grasped by an individual to thereby facilitate insertion of the respective connector ends within the corresponding housing 15. To even further facilitate this positioning, a bracket member 83 is used, this bracket member fixedly attached to the circuit card 11 in the proximity of optical connector assemblies 13. The bracket includes an apertured flange segment 85 which projects substantially perpendicularly to the plane of card 11 and a side wall member 87 designed for being attached directly to card 11 (e.g., at an opposing surface from outer surface 47). The handle portion 81 of connector 41' further includes projecting flange segments 89 which in turn are adapted for being aligned with and frictionally inserted within a respective opening 93 located within flange 85. It is thus readily possible to insert connector 41' within bracket 83 to facilely achieve connection with the corresponding circuit tabs 45 whereupon charging of card 11 may occur. The aforementioned handle arrangement facilitates positioning of card 11 within connector 25 as well as its subsequent removal therefrom. This latter operation is achieved because it is preferred to connect the charging unit of the invention to card 11 prior to removal of the card from the connector 25. This further assures substantional prevention of any damage to the card components as may occur during such removal in an uncharged state. Handle portion 81, like that of the insulator block 59, is preferably plastic (e.g., thermoplastic).

Thus there has been shown and described an improved circuit card assembly wherein the fiber optic connector of said assembly uniquely enables electrical charging of the circuit card therethrough prior to positioning and electrically coupling of the card to a mother circuit board member. Electrical connection is uniquely provided to selected circuit layers within the card such that an electrical connector capable of providing such charging when inserted within the fiber optic connector assembly's housing can be readily coupled to these layers such that said charging can occur in a facile manner. As also described herein, the design of the charging connector is such that insertion thereof within the assembly housing and its subsequent detachment from the card to enable insertion of the fiber optic connector is relatively easily accomplished. This invention thus provides the combined advantages of optical fiber transmission and connection with electrical charging of the circuit card such that the card can be coupled and uncoupled from the mother board of the computer without harm to the various components of the card and other adverse results experienced in the past when such connections were broken without such charging.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a circuit card assembly including a circuit card having at least one fiber optic connector assembly located thereon for being optically connected to corresponding circuitry in said card assembly, said fiber optic connector assembly including a housing located on a first surface of said circuit card to occupy a predetermined area on said card, said housing adapted for having a fiber optic cable connector positioned therein during operation of said card assembly, the improvement comprising:

means for providing electrical connection to said card assembly to achieve electrical charging of said circuit card prior to positioning of said fiber optic cable connector within said housing, said electrical connection occurring within said predetermined area on said circuit card occupied by said connector housing of said fiber optic connector assembly, said housing including an opening therein adjacent said predetermined area on said circuit card, said electrical charging occurring through said opening.

2. The improvement according to claim 1 wherein said means for providing said electrical connection comprises a plurality of circuit tabs spacedly located on said first surface of said circuit card and electrically coupled to selected circuitry within said card.

3. The improvement according to claim 2 wherein each of said circuit tabs comprises a metallic member of elongated configuration.

4. The improvement according to claim 3 wherein each of said circuit tabs comprises a copper strip.

5. The improvement according to claim 2 wherein said means for providing electrical connection to said card assembly further includes an electrical connector having therein a plurality of electrical contacts and adapted for being positioned within said housing, each of said contacts adapted for electrically contacting a respective one of said circuit tabs located on said first surface of said circuit card when said connector is positioned within said housing.

6. The improvement according to claim 5 wherein each of said contacts is a spring contact, each of said contacts adapted for slidably engaging said respective one of said circuit tabs to thereby form a wiping type of engagement between said contacts and said circuit tabs.

7. The improvement according to claim 5 wherein said card assembly is adapted for use within a computer system, said electrical connector adapted for being electrically coupled to the power supply for said system to thereby achieve said charging of said circuit card using said power supply of said computer system.

8. The improvement according to claim 5 wherein said electrical connector further includes a handle portion as part thereof, said handle adapted for being grasped by an individual during said charging of said circuit card to thereby assist in said positioning of said electrical connector within said housing.

9. The improvement according to claim 8 wherein said electrical connector is adapted for being removably secured to said circuit card during said charging to thereby further assist in said positioning of said connector within said housing.

10. The connector according to claim 9 further including a bracket member adapted for being secured to said circuit card in the vicinity of said housing, said electrical connector adapted for being removably secured to said bracket member.

11. The improvement according to claim 5 wherein at least two of said contacts within said electrical connector are of different lengths relative to the direction of said positioning of said electrical connector within said housing to thereby provide sequential engagement with said respective ones of said circuit tabs during said positioning, said sequential engagement in turn enabling sequential application of selected voltages to said circuit card during said charging thereof.

12. The improvement according to claim 1 wherein said predetermined area of said circuit card wherein said electrical connection occurs to achieve said charging is located along an outer edge of said circuit card to thereby facilitate said charging.

* * * * *